(12) United States Patent
Gormish et al.

(10) Patent No.: US 7,506,817 B2
(45) Date of Patent: Mar. 24, 2009

(54) LOCATION OF MACHINE READABLE CODES IN COMPRESSED REPRESENTATIONS

(75) Inventors: Michael Gormish, Redwood City, CA (US); Xiaojun Feng, West Lafayette, IN (US)

(73) Assignee: Ricoh Co., Ltd., Tokyo (JP)

( * ) Notice: Subject to any disclaimer, the term of this patent is extended or adjusted under 35 U.S.C. 154(b) by 533 days.

(21) Appl. No.: 11/014,375

(22) Filed: Dec. 14, 2004

(65) Prior Publication Data

US 2006/0124744 A1 Jun. 15, 2006

(51) Int. Cl.
*G06K 7/10* (2006.01)
(52) U.S. Cl. .............................. 235/462.01; 235/472.01
(58) Field of Classification Search ................. 235/462.01–462.47, 454, 455, 472.01, 472.02, 235/472.03, 494, 470
See application file for complete search history.

(56) References Cited

U.S. PATENT DOCUMENTS

| | | | |
|---|---|---|---|
| 6,336,587 B1* | 1/2002 | He et al. ................. | 235/462.45 |
| 6,726,105 B2* | 4/2004 | Patel et al. ............. | 235/462.45 |
| 6,766,965 B2* | 7/2004 | D'Arrigo ................. | 239/102.2 |
| 6,824,058 B2* | 11/2004 | Patel et al. ............... | 235/462.2 |
| 7,150,399 B2* | 12/2006 | Barrus et al. ........... | 235/462.01 |
| 2005/0274807 A1* | 12/2005 | Barrus et al. ........... | 235/462.25 |
| 2006/0124744 A1* | 6/2006 | Gormish et al. ........ | 235/462.08 |

* cited by examiner

*Primary Examiner*—Thien M Le
(74) *Attorney, Agent, or Firm*—Blakely, Sokoloff, Taylor & Zafman LLP

(57) ABSTRACT

A method, apparatus, and article of manufacture for locating machine readable codes (e.g., bar codes) in compressed representations are described. In one embodiment, the method comprises obtaining information from a file of a compressed representation of an image and locating a machine-readable code in the compressed representation of the image.

76 Claims, 10 Drawing Sheets

Begin from the peak and expands it horizontally until the magnitude decreases to a certain level (e.g., 50% of the peak value)
601

Start from the detected row and expands it vertically until the average magnitude of the rows decreases to a certain level (e.g., 50% of the average magnitude of the original detected row)
602

FIG. 6

LOCATION OF MACHINE READABLE CODES IN COMPRESSED REPRESENTATIONS

FIELD OF THE INVENTION

The present invention relates to the field of machine-readable code detection and the refinement of machine-readable codes; more particularly, the present invention relates to detecting machine-readable codes in images while the images are in the compressed domain.

BACKGROUND OF THE INVENTION

Barcodes are commonly used to provide electronic identification of physical artifacts. They are printed on different types of documents to store information for later retrieval, such as supermarket receipts, air tickets, product packages, etc. Moreover, they can also function as control keys in multimedia systems.

It is thus important for automated systems to be able to detect the locations of barcodes in a document image in order to decode them to retrieve the data. Some commercial products can decode barcodes accurately. However, the typical practice for using barcodes in documents is to surround barcodes by white space to insure detection. Efficiently locating barcodes in high resolution scans is still an open issue. Previous research in this field mainly focuses on detecting barcodes in the pixel domain, which is computationally expensive for page size, high resolution scanned images.

Several approaches are commonly used for barcode detection. In one approach, the stripes of a barcode are first detected by applying connected component analysis, and then the barcode regions are determined by grouping the connect components. For example, one proposal to detect the barcode region includes grouping connected components into barcode blocks in a down-sampled and background-removed image. For more information, see U.S. Pat. No. 4,948,955, entitled "Barcode Location Determination", issued on Aug. 14, 1990. A system that applied connected component analysis to detect both horizontal and vertical barcodes, conditioned on the specifications of the shapes of the stripes and the gaps between adjacent stripes was described in U.S. patent application Ser. No. 09/522,978, entitled "Method of Reading Barcode and Barcode Reading System," filed Mar. 10, 2000 (U.S. Publication No. 2002/0074405A1), published on Jun. 20, 2002).

There are also barcode detection techniques that use grids to divide the document image into small cells. A certain feature for each cell is calculated to determine whether it belongs to a barcode region or not, and finally the cells are grouped together to determine the barcode region. Different features can be applied. For example, one technique uses the matching between adjacent rows/columns in three directions. For more information, see EPO Patent No. 0894311B1, entitled "Omnidirectional Barcode Locator," issued on Jun. 10, 1999. Another technique uses the black-white transitions along the grids. For more information, see EPO Application No 1416421A1, entitled "Barcode Detection System and Corresponding Method." Still another technique detects some parallel stripe patterns by scanning each cell in various directions. For more information, see U.S. patent application Ser. No. 09/847,484, entitled "Fast Barcode Search," filed May 2, 2001 (U.S. Publication No. 2002/0162889A1, published on Nov. 7, 2002).

Other methods make use of histograms. For example, one method detects a certain histogram pattern in segments of a particular type of barcode, the POSTNET code. But since it only captured the characteristics of POSTNET code as described in U.S. Pat. No. 5,073,954, entitled "Bar Code Location and Recognition Processing System," issued on Dec. 17, 1991, the usage of this method is limited. A method to detect barcodes that match a set of off-line trained sample barcodes was introduce in U.S. patent application Ser. No. 09/877,581, entitled "Automatically Extracting Graphical Bar Codes," filed on Jun. 7, 2001 (Publication No. 2002/0196979A1, published on Dec. 26, 2002). Candidate barcode regions are selected by applying a matched filter along several preselected directions in windows centered at different locations. The geometric verification on the deskewed candidate barcode region is implemented by projecting the barcode onto orthogonal axes and threshold the histograms.

All these previous approaches for detecting barcodes work in the pixel domain and are computationally expensive on large images.

JPEG 2000 is a standardized wavelet-based compression method to represent digital images in a coherent code-stream and file format. For more information, see "Information technology—JPEG 2000 image coding standard—part 1: core coding system", ISO/IEC 15444-1. Compared to other compression standards, JPEG 2000 has advantages such as access to different resolutions and different parts of an image. In a JPEG 2000 codestream, compressed blocks of wavelet coefficients and header data are included. The wavelet coefficients provide detailed high frequency information of the image along different directions and on different scales. Each wavelet subband of each level is partitioned into local groups of typically 32×32 or 64×64 coefficients called code-blocks. Each code-block is independently encoded. Main header data contains the high level structural description of the entire image and coding parameters used. The packet headers contain information such as number of bits allocated to each code-block, the number of zero bit-planes and the coding passes for the purpose of decoding. JPEG 2000 header information has previously been used to find regions of interest for purposes such as comparing documents.

SUMMARY OF THE INVENTION

A method, apparatus, and article of manufacture for locating machine readable codes (e.g., bar codes) in compressed representations are described. In one embodiment, the method comprises obtaining information from a file of a compressed representation of an image and locating a machine-readable code in the compressed representation of the image.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 6 is a flow diagram of one embodiment of a process for determining an initial region.

DETAILED DESCRIPTION OF THE PRESENT INVENTION

A method and apparatus for detecting machine readable codes (e.g., one-dimensional barcodes) in document images (e.g., a JPEG 2000 document image) is described. In one embodiment, detecting the machine-readable codes occurs in two operations: candidate code detection and location refinement. Both operations work in the compressed domain of a JPEG 2000 document image. In one embodiment, the locations of candidate codes are extracted from the header data of a file containing compressed data and verified by checking part of the decoded coefficients of the file. Because only a small amount of the compressed data is used, this technique has a low complexity relative to algorithms that use all of the pixel data. Thus, the present invention introduces a technique to locate machine-readable codes (e.g., barcodes) in documents in the compressed domain (e.g., in the JPEG 2000 compressed domain), and hence reduce the required computational load significantly.

In one embodiment, the file (e.g., JPEG 2000 file) is modified with a "cleaned up" or "regenerated" machine readable code (e.g., bar code).

Figure 1:
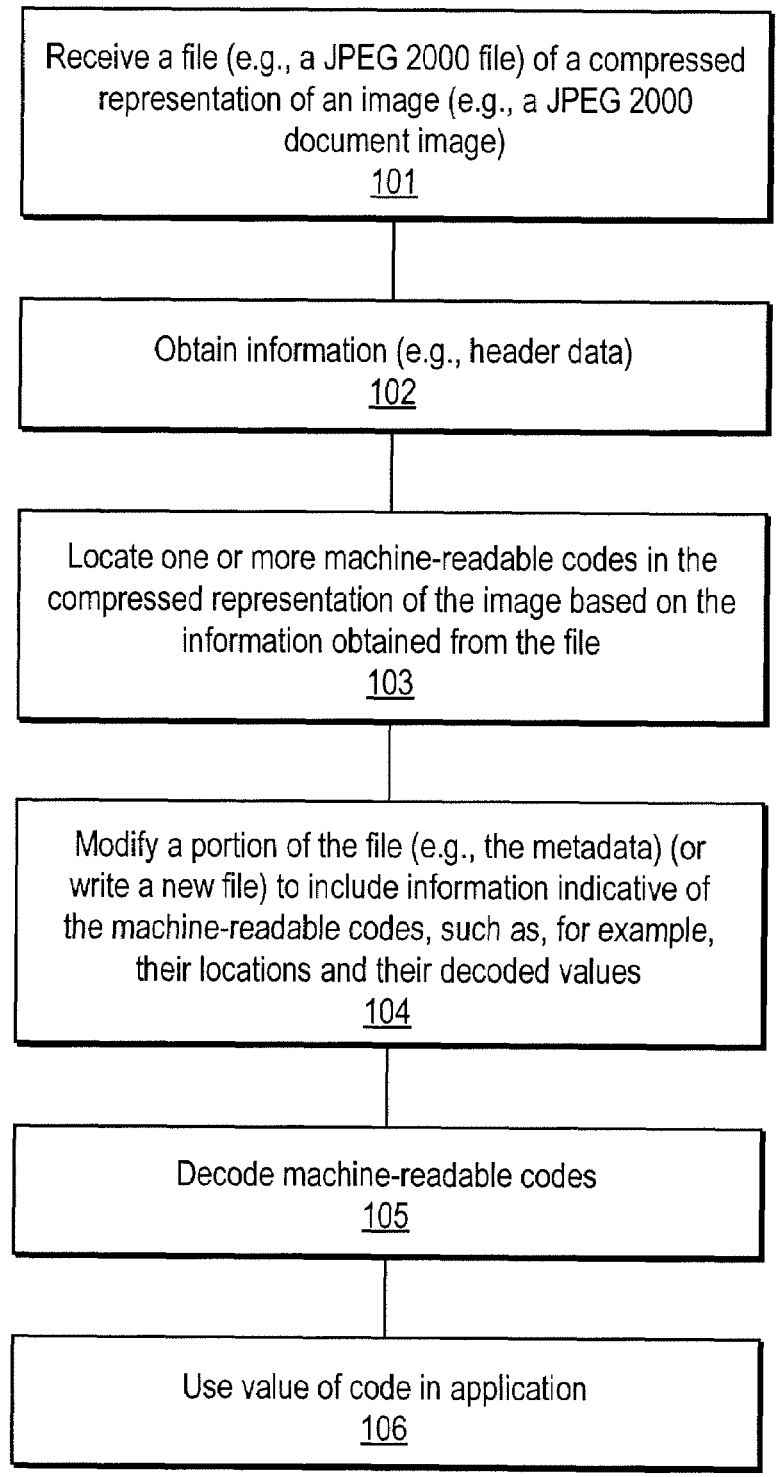
FIG. 1 is a flow diagram of one embodiment of a machine-readable code (e.g., barcode) location process.

FIG. 1 is a flow diagram of one embodiment of a machine-readable code (e.g., barcode) location process. The process is performed by processing logic that may comprise hardware (circuitry, dedicated logic, etc.), software (such as is run on a general purpose computer system or a dedicated machine), or a combination of both.

Referring to FIG. 1, the process begins by processing logic receiving a file (e.g., a JPEG 2000 file) of a compressed representation of an image (e.g., a JPEG 2000 document image) (processing block 101). From the file, processing logic obtains information (e.g., header data) (processing block 102).

Once the information has been obtained, processing logic locates a machine-readable code in the compressed representation of the image based on the information obtained from the file (processing block 103). In one embodiment, processing logic locates the machine-readable codes by extracting a location of each of the machine-readable codes from the info in the file and verifying each location has a machine-readable code by checking decoded data (e.g., decoded coefficients) for a portion of the file (e.g., a JPEG 2000 file).

In one embodiment, after locating one or more machine-readable codes, processing logic modifies a portion of the file (e.g., the metadata) (or writes a new file) to include information indicative of the machine-readable codes, such as, for example, their locations and their decoded values (processing block 104). Note that this is optional.

In another embodiment, header data are used for candidate barcode locating and partial coefficients are used for location refinement. In one embodiment, barcode refinement is performed by exploiting the difference of local variances of wavelet coefficients along horizontal and vertical directions. The locations and decoded values of barcodes may be placed in the metadata of a JPEG 2000 file.

After locating the one or more machine-readable codes, processing logic decodes them (processing block 105) and optionally uses the decoded machine-readable codes in an application as described in more detail below (processing block 106).

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

Embodiments of the present invention locate machine-readable codes (e.g., bar codes) in images that are compressed. In one embodiment, the compressed data is JPEG 2000 compressed data, although this is not a requirement. Because the techniques operate with data in the compressed domain, decompression of all the image data does not need to be performed to locate the machine-readable codes, thereby achieving high computational efficiency.

Figure 2:
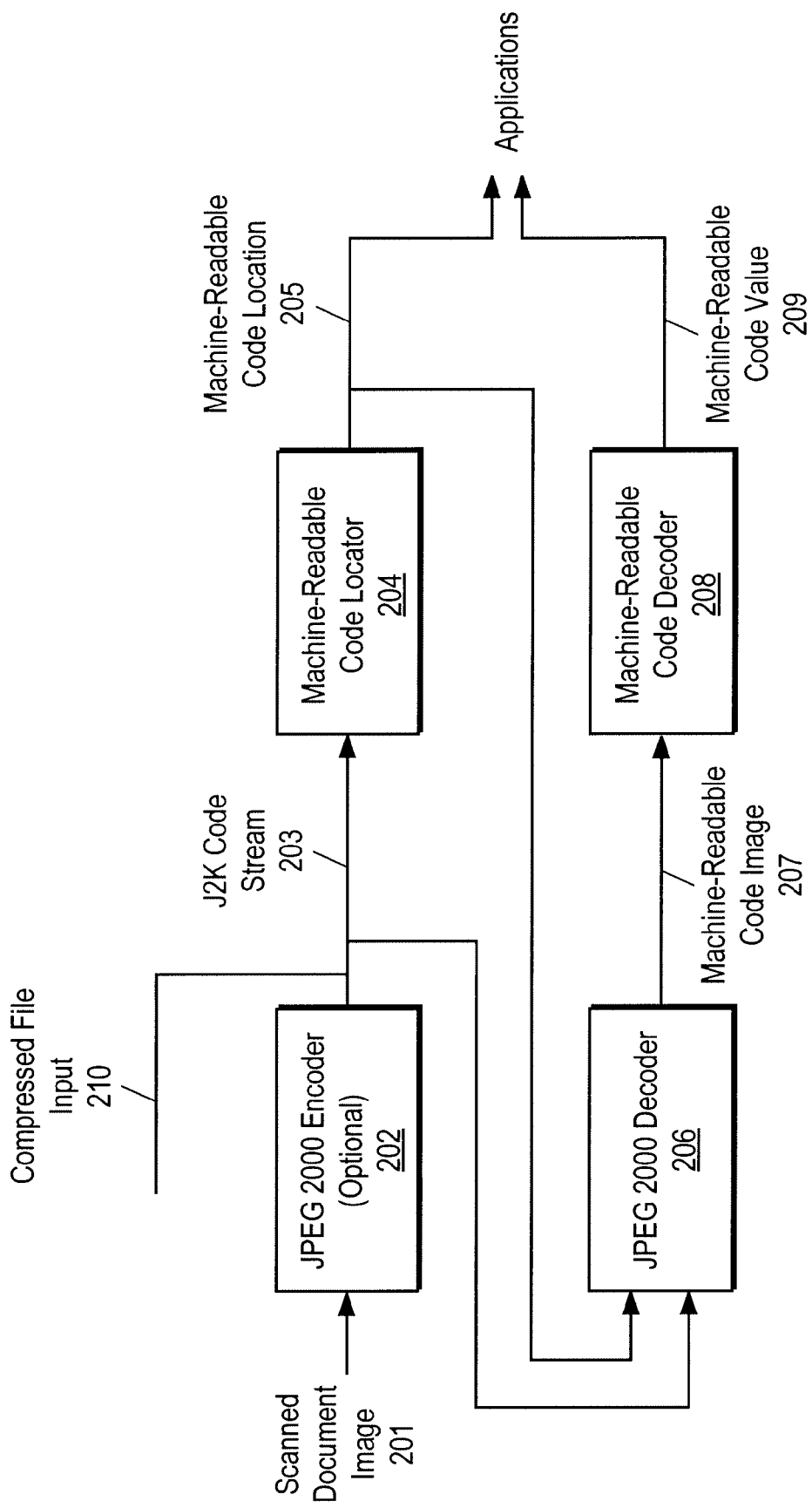
FIG. 2 is a data flow diagram of one embodiment of a barcode processing system for JPEG 2000 files.

FIG. 2 is a data flow diagram of one embodiment of a barcode processing system for JPEG 2000 files. Each of the units in FIG. 2 includes processing logic that may comprise hardware (e.g., circuitry, dedicated logic, etc.), software (such as is run on a general purpose computer system or a dedicated machine), or a combination of both.

Referring to FIG. 2, a scanned document image 201 is first compressed to a JPEG 2000 image using JPEG 2000 encoder 202. The JPEG 2000 image is represented as JPEG 2000 code stream 203. The scanning resolution is typically 300 dpi or 600 dpi. Note that JPEG 2000 encoder 202 is optional. Alternatively, JPEG 200 code stream 203 may be received from compressed file input 210.

With JPEG 2000 code stream 203 as an input, machine-readable code locator 204 locates machine-readable codes from the header data of JPEG 2000 code stream 203. In one embodiment, the machine-readable codes comprise the bar codes may be located in a number of ways, which will be described in greater detail below. Once the locations of the machine-readable codes are known, that information can be stored in the metadata of the JPEG 2000 file or in other locations in the file in alternative embodiments.

In one embodiment, the corresponding machine-readable code regions in the image are first decompressed by a JPEG 2000 decoder 206 to produce one or more of machine-readable code images 207, which are input to machine-readable decoder 208 that uses machine-readable code decoding software to extract a machine-readable code value 209. In one embodiment, JPEG 2000 decoder 206 decompresses the corresponding barcode regions in the image based on barcode locations identified by machine-readable locator 204 to generate barcode images, and decoder 208 decodes the barcode images to generate bar code values. The decoded machine-readable code (e.g., barcodes) can also be stored in the metadata of the JPEG 2000 file so that they do not need to be decoded again in future use.

In the case of barcodes, there are several applications that may make use of the obtained barcode locations and values. Note that these applications could make use of other machine-readable codes as well. The barcodes values can be directly used for artifact recognition, database searching, controlling a device (e.g., scan a barcode to cause an email to be sent, scan a bar code to cause lights to be turned on; etc.). For example, with the obtained location and value information, a new clear version barcode image can be generated by a barcode generating software to replace the original blurred barcode image using the technique described in U.S. patent application Ser. No. 10/314,014, entitled, "A Device for Scanning and Printing Barcodes," filed Dec. 5, 2002 (U.S. Publication No. 2004/0108381, published Jun. 10, 2004), and assigned to the corporate assignee of the present invention. The barcode regions can thus be refreshed each time after scanning, hence avoiding the blurring effect by multiple times of printing and scanning. In a JPEG 2000 file, this new image data could be compressed and used to replace data in the compressed file. In an JPM file, this new image data could be stored in an additional layer of the file that would obscure the old barcode under normal printing, but would allow the original scan to be accessed if needed.

Figure 3:
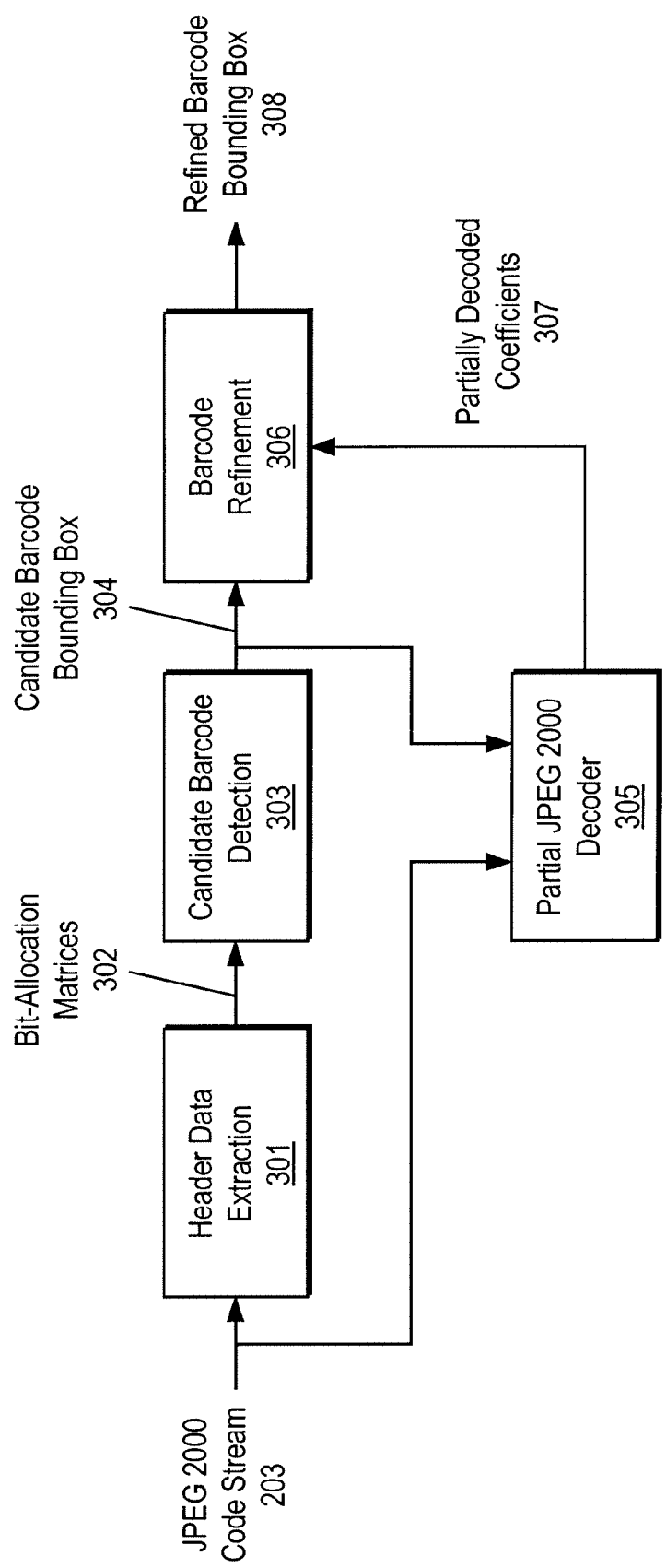
FIG. 3 is a block diagram of one embodiment of a barcode locator.

FIG. 3 is a block diagram of one embodiment of a barcode locator. Each of the blocks is performed by processing logic that may comprise hardware (e.g., circuitry, dedicated logic), software (such as is run on a general purpose computer system or a dedicated machine), or a combination of both. Referring to FIG. 3, header data extraction unit 301 receives JPEG 2000 code stream 203 and obtains a bit-allocation of a JPEG 2000 document image from the header data in code stream 203. The packet headers can be extracted from the code stream of a JPEG 2000 file. That is, out of the header data, bit-allocation data can be derived that describes the number of bits assigned to each code-block. The bit-allocation data can be arranged to form a matrix (referred to herein as a bit-allocation matrix) that simulates the entropy distribution of the original JPEG 2000 image.

In one embodiment, the bit allocation is obtained using the method set forth in U.S. patent application Ser. No. 10/044,420, entitled "Header-Based Processing of Images Compressed Using Multi-Scale Transforms," filed Jan. 10, 2002 (U.S. Publication No. 2003/0165273, published Sep. 4, 2003), assigned to the corporate assignee of the present invention. In that application, JPEG 2000 header data is extracted from the packet headers of multiple resolutions of wavelet coefficients. One of the items that is easily extracted from the header data is the number of bytes used to encode a codeblock of wavelet coefficients. The number of bytes used for a codeblock is referred to herein as the bit allocation matrix.

A typical 8.5 by 11 inch sheet of paper scanned at 300 dpi produces a 2550 by 3300 pixel image. A wavelet compression system transforms that image into 3L+1 matrices of wavelet coefficients, where L is the number of levels of wavelet transform and is typically 5 or 6 for this sized image. At the highest resolution, there are 3 matrices of wavelet coefficients LH, HL, and HH, each of size roughly half the horizontal and vertical size of the original image. Each additional level is again half the horizontal and vertical size. For purposes herein, LH is used to mean vertically low-passed coefficients and horizontal high-passed coefficients, HL refers to vertically high-pass and horizontal low-pass, and HH refers to the high pass filter of the wavelet transform that was used in both directions. JPEG 2000 groups the coefficient matrices into code-blocks, typically of size 32×32 or 64×64. Thus, there might be 40×52 codeblocks in the highest resolution subband. There is one value in the compressed header data of a JPEG 2000 codestream that indicates the number of bytes used to store one layer of data for a codeblock of coefficients. The number of bytes needed to store a codeblock of data is an indication of the activity in that codeblock. Thus, it is easy to obtain a small matrix directly from the compressed data that represents the activity of the wavelet coefficients of a particular type at a particular resolution. This is the purpose of header data extraction unit 301 which produces bit-allocation matrices 302.

For the purpose of locating barcodes, typically, only data from the three subbands of the highest resolution are needed, although more could be used. The small size of the bit allocation matrices allows operations to be performed on them much faster than on the image as a whole.

Using the bit-allocation data from bit-allocation matrices 302, candidate barcode detection unit 303 extracts the candidate barcode regions and outputs one or more candidate barcode bounding boxes 304. One embodiment of a process for performing candidate barcode detection and generating candidate barcode boundary boxes is described in more detail below.

Partial JPEG 2000 decoder 305 receives JPEG 2000 code stream 203 and candidate barcodes bounding box 304 and, in response thereto, generates partially decoded coefficients 307 corresponding to the location of the one or more bounding boxes in the image. In one embodiment, partial JPEG 2000 decoder 305 only decodes the candidate regions, and if necessary, their neighborhood code blocks, for detailed wavelet coefficients in a certain scale.

In one embodiment, barcode refinement unit 306 performs refinement of barcodes in response to receiving candidate barcode bounding box 304 and partially decoded coefficients 307. In one embodiment, barcode refinement unit 306 refines barcodes by examining local variances of the wavelet coefficients to refine the barcodes locations and reject false barcodes. In one embodiment, this is done using barcode refinement unit 306 to output a refined barcode bounding box 308.

Locating Barcodes

Figure 4:
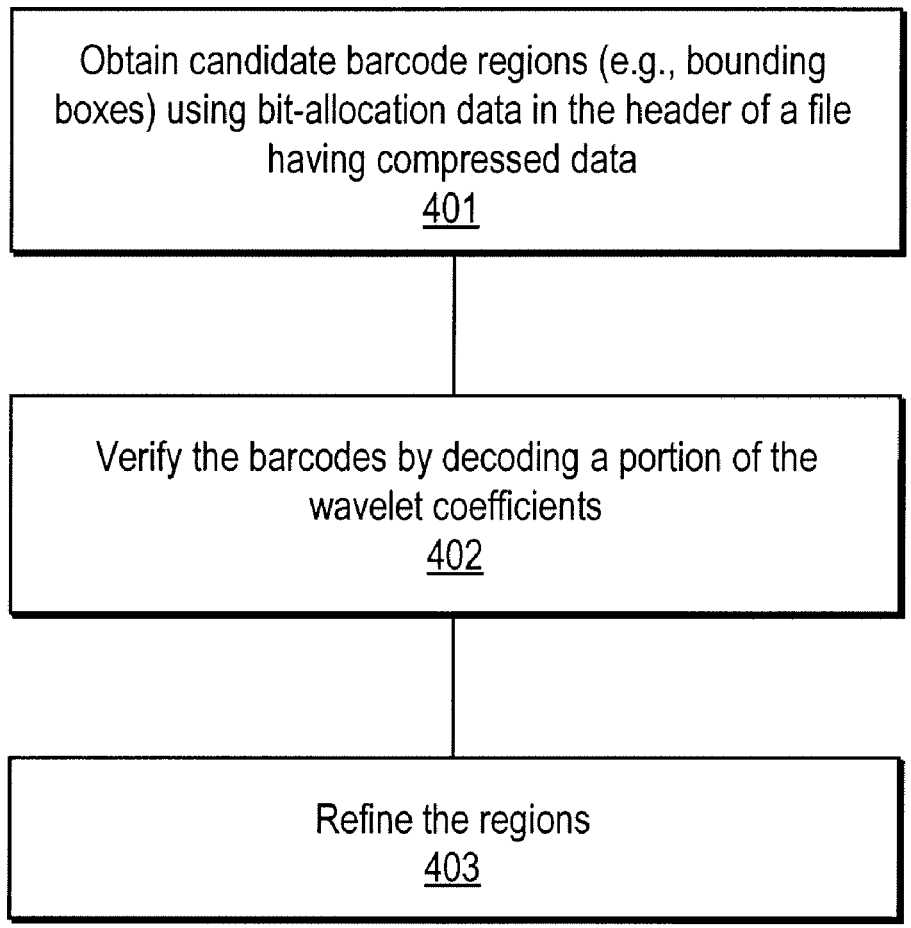
FIG. 4 is a flow diagram of one embodiment of a process for detecting the barcode from a JPEG 2000 compressed document image.
Figure 5:
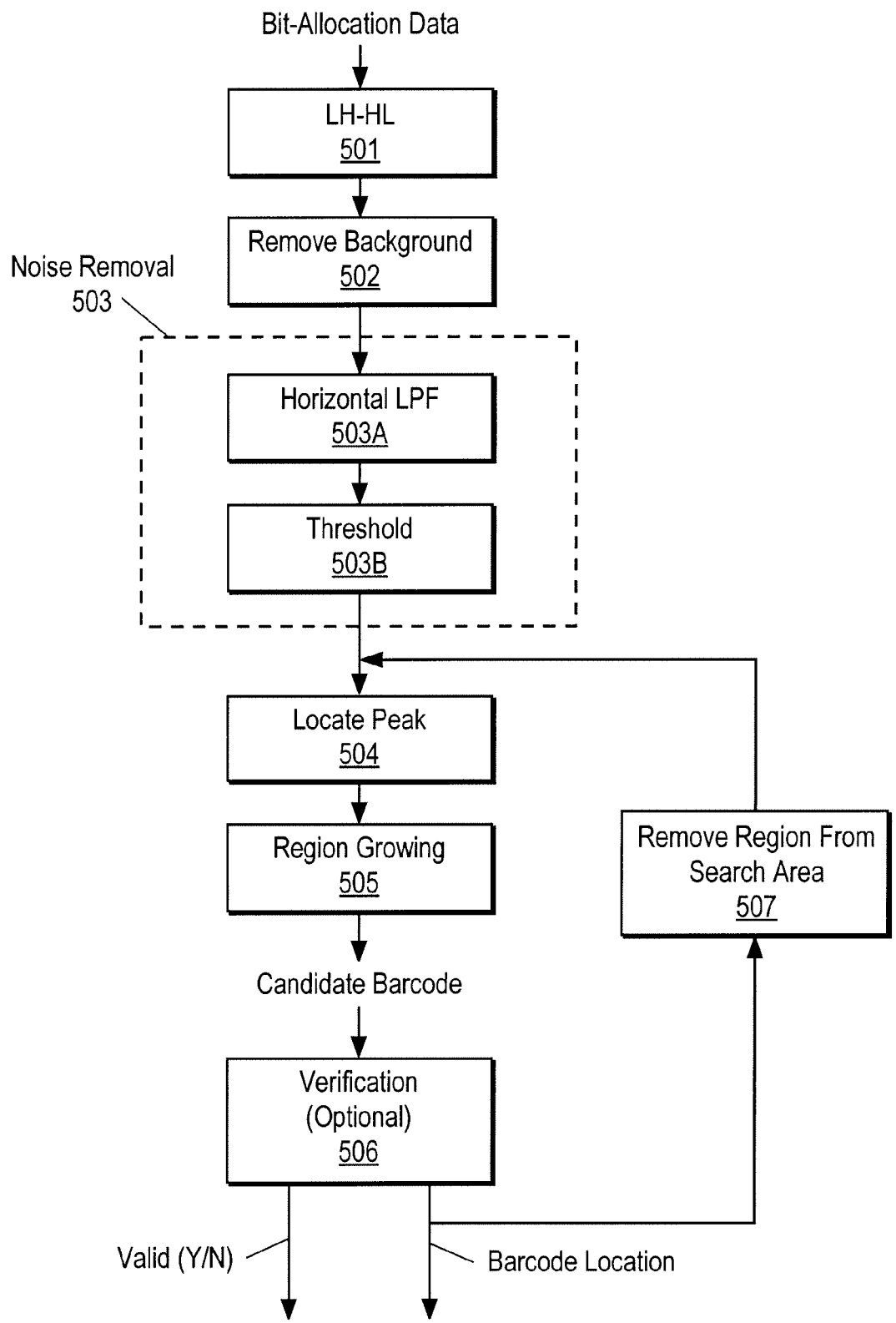
FIG. 5 is a flow diagram of one embodiment of a process for obtaining candidate barcode regions.
Figure 7:
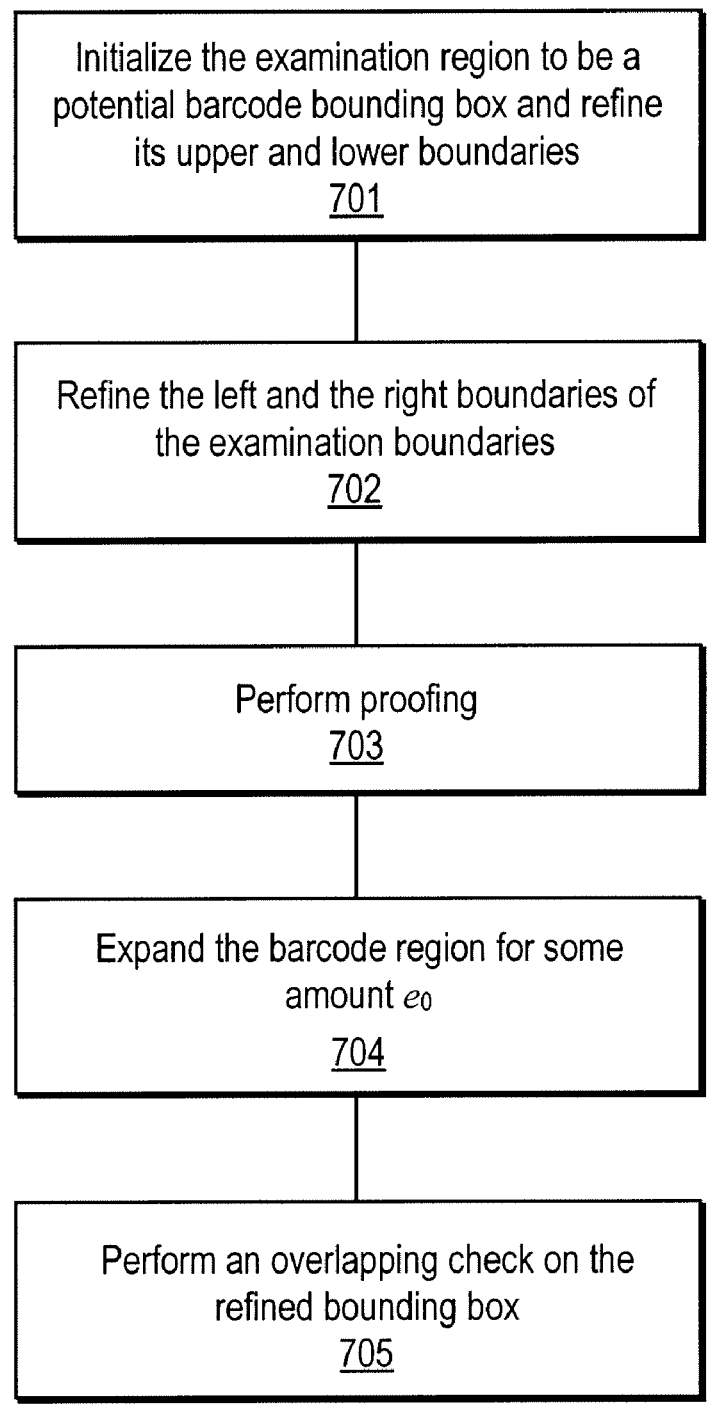
FIG. 7 is a flow diagram of one embodiment of a process for verifying and refining barcodes.

FIG. 4 is a flow diagram of one embodiment of a process for detecting the barcode from a JPEG 2000 compressed document image. The process is performed by processing logic that may comprise hardware (e.g., circuitry, dedicated logic, etc.), software (such as is run on a general purpose computer system or a dedicated machine), or a combination of both. Referring to FIG. 4, processing logic obtains candidate barcode regions (e.g., bounding boxes) using bit-allocation data in the header of a file having compressed data (processing block 401). Using the candidate barcode regions, processing logic verifies the barcodes by decoding a portion of the wavelet coefficients (processing block 402) and refines the regions (processing block 403). FIG. 5 is a flow diagram of one embodiment of a process for obtaining candidate barcode regions, while FIG. 7 is a flow diagram of one embodiment of a process for verifying and refining barcodes.

Generating Candidate Locations

In one embodiment, the bit-allocation matrices in the header data are used to extract the candidate barcode regions. FIG. 5 is a flow diagram of one embodiment of a process for obtaining candidate barcode regions. The process is performed by processing logic that may comprise hardware (e.g., circuitry, dedicated logic, etc.), software (such as is run on a general purpose computer system or a dedicated machine), or a combination of both.

For convenience of the technical description, the following is focused on horizontal one-dimensional barcodes detection (i.e., the "bars" are oriented vertically but the rendering order is horizontal). Vertical barcodes can be detected simultaneously by interchanging the role of the HL and LH and horizontal and vertical processing, in processing blocks 501, 503A and 505.

Referring to FIG. 5, processing starts with processing logic obtaining the difference between LH and HL coefficients in the compressed image data. Observing the fact that horizontal barcodes have large magnitude high frequency components along the horizontal direction but not in the vertical direction, in one embodiment, processing logic calculates the difference between the bit-allocation matrices of the LH and HL subbands of the first level (finest resolution) to capture this. Large magnitude coefficients take more data to compress and thus have large values in the bit-allocation matrices. In an alternative embodiment, instead of subtraction, another method of capturing the difference may be used. For example, since more bits are expected to be allocated to codeblocks of LH coefficients than of HL coefficients, the ratio of LH/HL is very large in barcode regions and close to 1 in non-barcode regions and can be used in place of the difference.

Let $E_{HL1}$ and $E_{LH1}$ denote the bit-allocation matrices of the two subbands respectively. $E_{HL1}(i,j)$ is the bit-allocation for the code-block at position i,j in the HL subband of the first decomposition level. $E_{LH1}(i,j)$ is the bit-allocation for the code-block at position i,j in the LH subband of the first decomposition level.

It is expected that $E_{LH1}(i,j)-E_{HL1}(i,j)>>0$ if code-block (i,j) belongs to a barcode region, while $E_{LH1}(i,j)-E_{HL1}(i,j)\approx 0$ if code-block (i,j) belongs to general text or image regions. Therefore, a bit-allocation difference image is obtained as $img_0=E_{LH1}-E_{HL1}$. Note that, in one embodiment, this is only done for the first level (the size is approximately ¼ the number of code blocks). Symmetrically, $E_{LH1}(i,j)-E_{HL1}(i,j)<<0$ can capture vertical barcodes. So both horizontal barcodes and vertical barcodes on a given document image can be detected through this technique.

After obtaining the difference, processing logic removes background points, which are non-barcodes (processing block 502). Note that some text or image might not be removed. A barcode region is considered to have high coefficients in the LH subband, hence having large values on the corresponding positions in the bit-allocation matrix for LH subband. Therefore, the pixels in $img_0$ whose corresponding LH bit-distribution data is lower than a certain threshold $t_{bg}$ is excluded for barcode candidate and set to 0's. In one embodiment, the threshold $t_{bg}$ is determined by calculating the average bit-allocation value in the LH1 subband, which is denoted as $\overline{E_{LH1}}$ (the average value of $E_{LH1}$), and then generating the threshold according to the following equation:

$$t_{bg}=0.9\times\overline{E_{LH1}}$$

Other thresholds may be used. Thus, processing logic removes background points and obtains a filtered image $img_1$ in this operation.

After removing background points, processing logic performs noise removal (processing block 503). In one embodiment, processing logic performs noise removal by first applying horizontal low pass filter (LPF) to the pixels in $img_1$ (processing block 503A). A one-dimensional filtered image, $img_2$, is obtained by passing each row of $img_1$ through a low pass filter to suppress noise. There are various filters that could be used here. In one embodiment, the simple triangle filter f={⅑, 2/9, ⅓, 2/9, ⅑} is used. In alternative embodiments, the filter {⅓, ⅓, ⅓} or a box filter are used. In the case of a vertical barcode, a vertical filter should be used. These filters are useful because while horizontal barcodes may be quite short, the width depends on the amount of data stored, and even a few bytes of storage uses several codeblocks.

After applying the low pass filter, processing logic performs filtering to further limit the number of candidate barcodes (processing block 503B). In one embodiment, a threshold $t_n$ is selected to filter $img_2$. In one embodiment, any pixel in $img_2$ with a value below that threshold is set to 0. Different thresholds may be used. A threshold that is too high removes some potential barcode signals, while a threshold that is too low extracts too many candidate barcodes and increase the computational load. In one embodiment, the threshold applied is calculated as follows. First, a histogram of the intensity values of $img_2$ is calculated. If each intensity value in $img_2$ is considered to be a random variable X, then a normalized histogram represents the probability density function of X. Therefore, the expectation $\bar{X}$ and the standard deviation $\sigma_X$ of X can be estimated from the histogram. The threshold is then defined to be $$t_n = \bar{X} + \sigma_x$$

The final thresholded image is denoted herein as $img_3$.

After removing noise, processing logic locates peaks in the final threshold image (processing block 504). In one embodiment, processing logic locates the peak in $img_3$ as a potential barcode and determines the bounding box of the potential barcode by applying region growing from the peak to the surrounding region.

FIG. 6 is a flow diagram of one embodiment of a process for locating peaks. The process may be performed by processing logic that may comprise hardware (e.g., circuitry, dedicated logic, etc.), software (such as is run on a general purpose computer system or a dedicated machine), or a combination of both.

Referring to FIG. 6, processing logic begins from the peak and expands it horizontally until the magnitude decreases to a certain level (e.g., 50% of the peak value) (processing block 601). Basically, the values of $img_3$ should be close for the same barcode; when the value gets smaller than ½ the maximum, it is assumed that it is not part of the same barcode. Other levels may be used, such as, for example, ⅓ the maximum. By doing this, processing logic locates the left and right margins of the barcode. Next, processing logic, starts from the detected row and expands it vertically until the average magnitude of the rows decreases to a certain level (e.g., 50% of the average magnitude of the original detected row) (processing block 602). By doing this, processing logic locates the upper and lower margins of the barcode.

Referring back to FIG. 5, after locating the largest peak in processing block 504, processing logic performs region growing starting at the location of the peak (processing block 505). In one embodiment, after performing region growing, processing logic verifies the detected candidate barcode region using a verification process (processing block 506). The verification process may adjust the region of the barcode. Whether the verification procedure is used or not, processing logic removes the region for the potential barcode from the $img_3$ (processing block 507). Then processing logic transitions back to processing block 504 for one or more iterations until no more candidate barcodes are detected or until some application defined number of barcodes have been located (e.g., a known number of barcodes exist). This may be indicated when all values in $img_3$ are zeros. After the process has completed, the outputs indicate whether there is a valid barcode as well as its location. In one embodiment, if there are multiple barcodes, the outputs indicate the location of each.

Barcode Refinement

In barcode refinement, each candidate barcode location obtained as described above is verified as containing a barcode by checking the local variances of its wavelet coefficients. In one embodiment, only the codeblocks corresponding to the candidate barcode region are decoded in a certain scale level $s_v$. When needed, the neighboring codeblocks of the candidate barcode region are also decoded. For the selection of the scale level $s_v$, under the condition that there has to exist obvious difference between horizontal and vertical variances in the barcode regions in that level, a higher $s_v$ (coarser resolution) is preferred for reducing computation. In one embodiment, for a scanned document image with resolution DPI, the following equation can be used to determine $s_v$:

$$s_v = \text{round}\left(\log\left(\frac{DPI}{300}\right)\right) + 3$$

where log is the base 2 logarithm. The "+3" is an offset which selects the $3^{rd}$ level for 300 dpi images. For a 300 dpi document, the difference of the wavelet coefficients along horizontal and vertical directions in the $3^{rd}$ scale level $|LH_3|-|HL_3|$ for the corresponding candidate barcode region is calculated. (Note that the $3^{rd}$ subband is used because log (300/300)=0. For a 600 dpi image, log(600/300)=1, so the $4^{th}$ subband could be used.)

A clear bound of the strong barcode signal is expected to be obtained from the weak surrounding background signals. Hence the bounding box can be refined.

FIG. 7 is a flow diagram of one embodiment of a process for refining barcodes. The process is performed by processing logic that may comprise hardware (e.g., circuitry, dedicated logic, etc.), software (such as is run on a general purpose computer system or a dedicated machine), or a combination of both. In the following description of FIG. 7, an examination region refers to the rectangle in which local variances as described above are calculated.

Referring to FIG. 7, processing logic begins by initializing the examination region to be a potential barcode bounding box provided as a result of the process of FIG. 5 (processing block 701). In one embodiment, two assumptions are used here:

1) A barcode has high coefficient variances along horizontal direction.
2) The background region surrounding the barcode does not have high coefficient variances along the horizontal direction.

Figure 8:
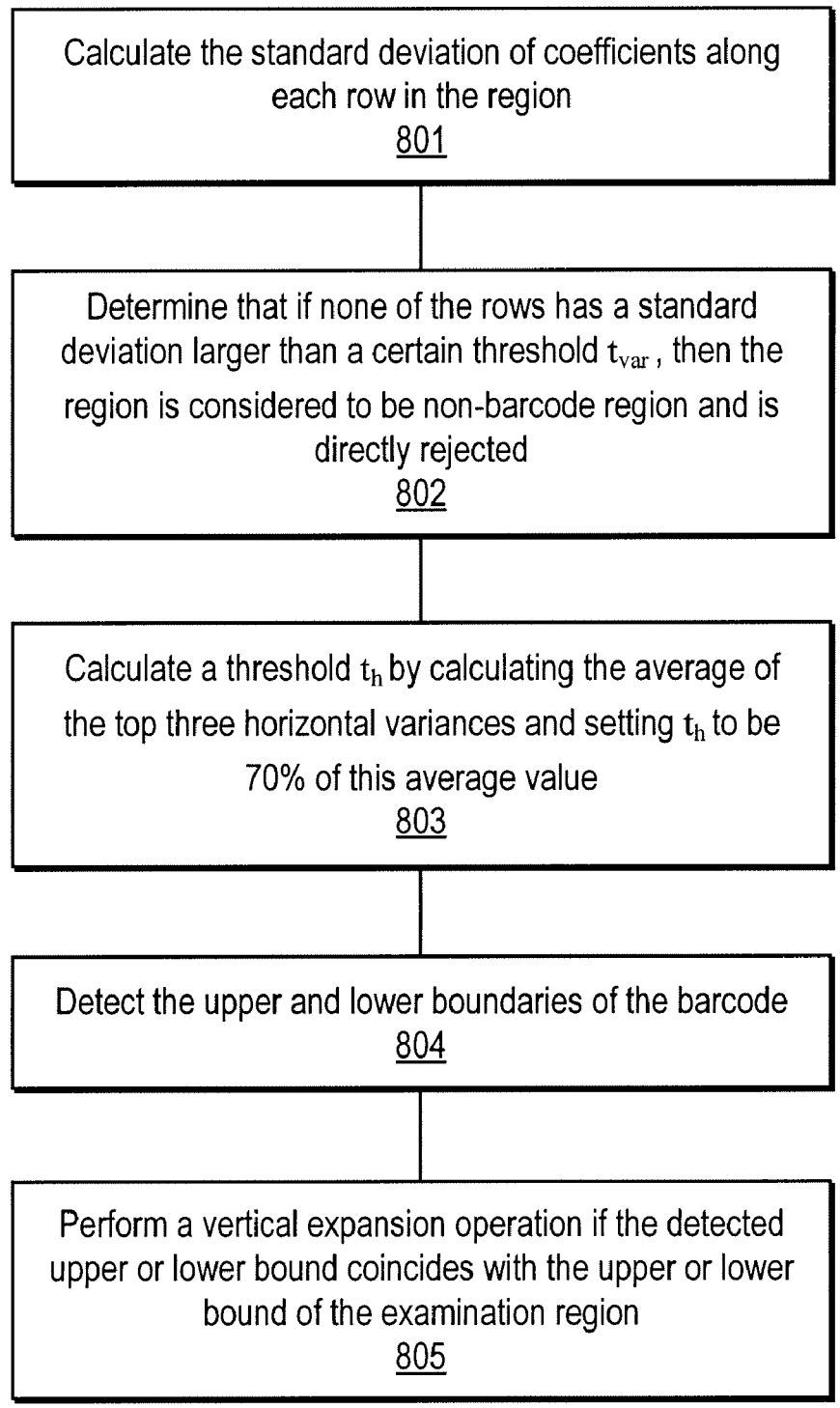
FIG. 8 is a flow diagram of one embodiment of a process for refining the upper and lower bounds.

Based on the above two assumptions, in one embodiment, initialization occurs according to the following operations set forth in flow diagram of FIG. 8. Referring to FIG. 8, the process begins by processing logic calcuating the standard deviation of coefficients along each row in the examination region (processing block 801). Next, processing logic determines that if none of the rows has a standard deviation larger than a certain threshold $t_{var}$, then the region is considered to be a non-barcode region and is directly rejected (processing block 802). Various methods can be used to select $t_{var}$. In one embodiment, $t_{var}$ is selected as follows by calculating the maximum value of $|LH_3|-|HL_3|$ in all the potential barcode regions and then setting $t_{var}$ to be ⅛ of this value.

Next, processing logic calculates a threshold $t_h$ by calculating the average of the top three horizontal standard deviations and setting $t_h$ to be 70% of this average value (processing block 803) and, thereafter, detects the upper and lower boundaries of the barcode (processing block 804). In one embodiment, processing logic detects these boundaries by thresholding the horizontal standard deviation by $t_h$ and choosing the longest segment of rows above $t_h$.

In one embodiment, processing logic performs a vertical expansion operation if the detected upper or lower bound coincides with the upper or lower bound of the examination region (processing block 805), such as in case the candidate bounding box does not cover the whole barcode. In this situation, the processing logic decodes upper or lower neighboring code blocks of the examination region.

Figure 9:
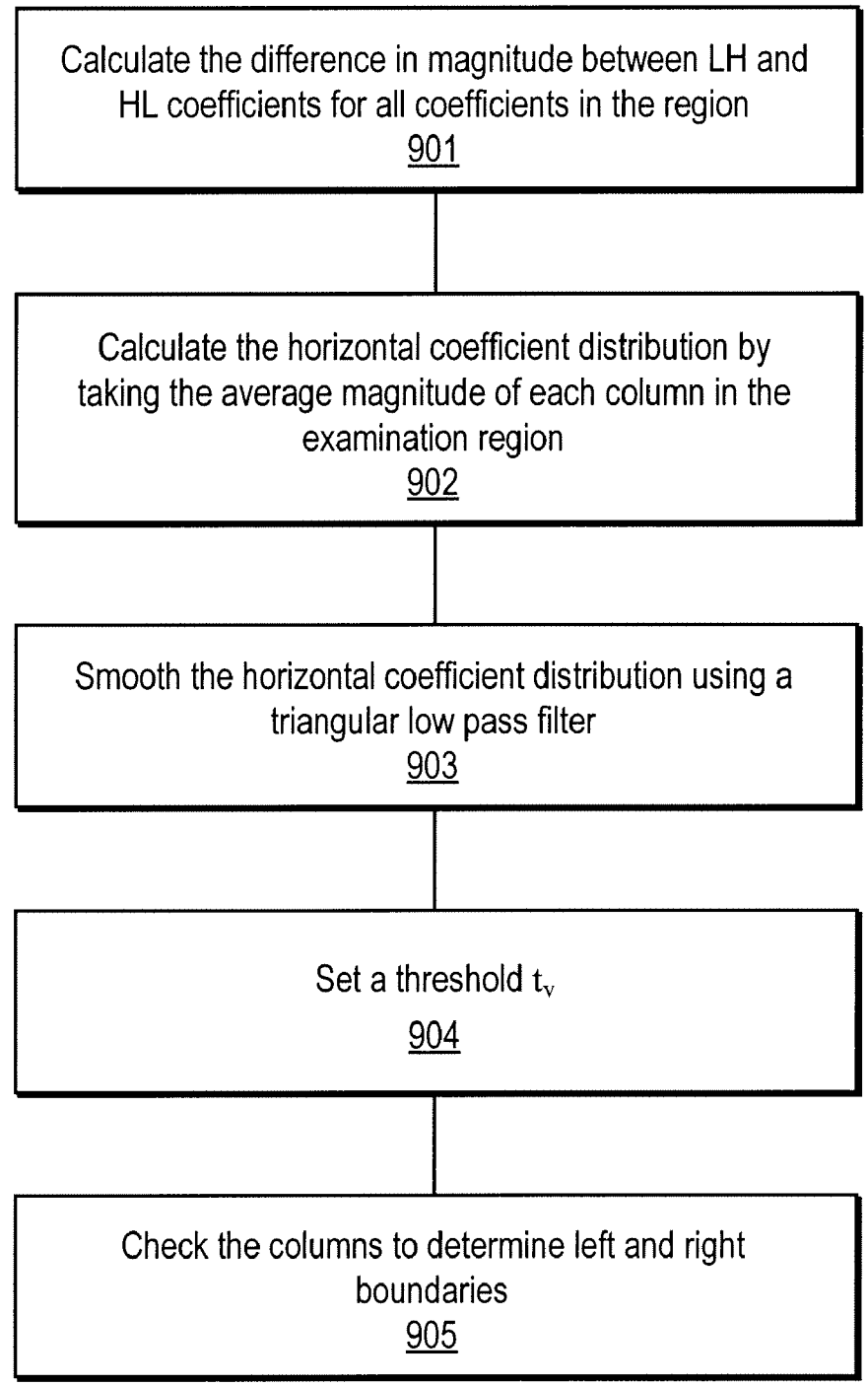
FIG. 9 is a flow diagram of one embodiment of a process for refining the left and right bounds.

Referring back to FIG. 7, after refining the upper and lower bounds, processing logic updates the left and right bounds of the original candidate barcode bounding box (processing block 702). Because the surrounding background does not have as strong a difference between LH and HL coefficients as the barcode, in one embodiment, processing logic refines the left and right bounds further. In one embodiment, this further refinement is performed according to the flow diagram of FIG. 9. Referring to FIG. 9, processing logic calculates the difference in magnitude between the LH and HL coefficients for all coefficients in the region (processing block 901). Then processing logic determines the average magnitude of this difference for each column (processing block 902). Next, processing logic smoothes the column averages using a triangular low pass filter as in processing block 503A of FIG. 5 (processing block 903). Thereafter, processing logic sets a threshold $t_v$ (processing block 904). In one embodiment, the threshold is set by averaging the top three values of the column averages and taking 25% of that average value as the threshold. In one embodiment, a coefficient less than threshold $t_v$ is considered to be a low-valued coefficient. Afterwards, processing logic checks the columns to determine left and right boundaries (processing block 905). In one embodiment, if more than 5 successive low-valued coefficients are detected, processing logic concludes that a boundary of the barcode region exists. By doing this, the left and right boundaries of the barcode can be estimated. As with FIG. 8, this process may lead to left and right boundaries that are beyond the original left and right boundaries produced by the barcode location process.

Referring back to FIG. 7, processing logic updates the examination region boundaries in processing blocks 701 and 702.

In one embodiment, after refining the left and right bounds, processing logic performs proofing (processing block 704). Processing logic updates the examination region to be bounded by the boundaries detected in operations above. As a final proofing step, processing logic may calculate the correlations between each neighboring pair of rows. In one embodiment, if the average correlation between rows does not exceed a threshold $t_{corr}$, then the region is rejected. From experiments, it is set that $t_{corr}=0.9$. Yet another approach for this final proofing step is to threshold the ratio of the horizontal variance versus the vertical variance; if this ratio is less than a threshold, which means there exists no obvious difference of variances along different directions, then the region is rejected.

To ensure that the updated examination region covers the entire barcode, processing logic expands for some amount $e_0$ (processing block 705). In one embodiment, the execution regions is expanded $e_0=3$ pixels at each of the four directions. At this point, the updated examination region bounding box is considered to be the refined barcode bounding box and is returned.

Lastly, in one embodiment, processing logic performs an overlapping check on the refined bounding box (processing block 706). If the bounding box overlaps with the bounding box of any already detected barcode, then this new barcode is considered to be a duplicate and will be ignored.

Some false alarms and misses may appear in the results. There are a number of remedies for these, some of which are as follows. The number of false alarms can be reduced by adding more strict conditions in the barcode refinement operation, such as, for example, setting the minimum acceptable size of a barcode. Misses are mainly caused by high threshold used to filter the bit-allocation matrix. Hence the threshold can be tuned to reduce the number of misses. However, there exists a trade-off between the threshold and the computation load. If a low threshold is set, the number of misses will be reduced, while more coefficients need to be decoded, which means more computation is needed. The occurrences of misses increases when the height of the barcode is too small (e.g., the height is less than the size of a code-block). Therefore, for small barcodes, increasing the scanning resolution is another way to reduce the number of misses.

Another technique can be used to determine the location of a predetermined number of barcode region, particularly if it is known that only a predetermined number of barcodes (e.g., one) are on the page. In this case, a high threshold can be used and reduced until the correct number of barcodes are found.

Alternative Barcode Detection Techniques

The technique disclosed above is applicable to at least location and verification of 1-D horizontal or vertical barcodes. Other barcodes, such as, for example, Codeblock, Code 16K, PDF 417, and QR-code, etc., do not have a predominately horizontal or vertical orientation. In this case, in one embodiment, the header information for the HH subband is used to find candidate locations for the barcodes. In one embodiment, the bit allocation matrix for the HH is used alone. In another embodiment, a linear combination of HH, LH, and HL bit allocation matrices is used in block 501 of FIG. 5. Likewise, in block 503A, neither a horizontal or vertical low pass filter is appropriate, and a two dimensional block filter such as, for example, $$[¼ \ ¼]$$

$$[¼ \ ¼]$$

is used.

In the verification step, the HH wavelet coefficients of the scale given by $s_v$ can be used instead of the horizontal coefficients. A linear combination of the variances of the LH, HL, and HH coefficients may also be used.

An Exemplary Computer System

Figure 10:
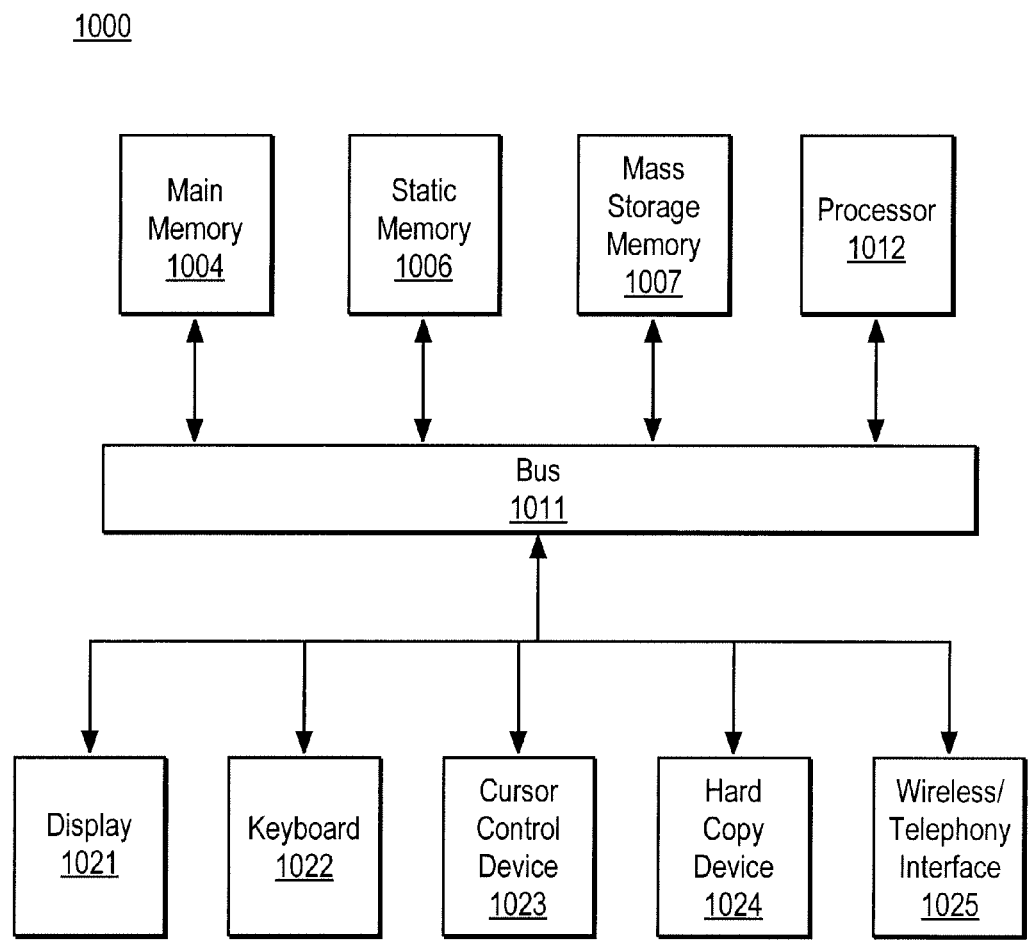
FIG. 10 is a block diagram of an exemplary computer system.

FIG. 10 is a block diagram of an exemplary computer system that may perform one or more of the operations described herein. Referring to FIG. 10, computer system 1000 may comprise an exemplary client or server computer system. Computer system 1000 comprises a communication mechanism or bus 1011 for communicating information, and a processor 1012 coupled with bus 1011 for processing information. Processor 1012 includes a microprocessor, but is not limited to a microprocessor, such as, for example, Pentium Processor, etc.

System 1000 further comprises a random access memory (RAM), or other dynamic storage device 1004 (referred to as main memory) coupled to bus 1011 for storing information and instructions to be executed by processor 1012. Main memory 1004 also may be used for storing temporary variables or other intermediate information during execution of instructions by processor 1012.

Computer system 1000 also comprises a read only memory (ROM) and/or other static storage device 1006 coupled to bus 1011 for storing static information and instructions for processor 1012, and a data storage device 1007, such as a magnetic disk or optical disk and its corresponding disk drive. Data storage device 1007 is coupled to bus 1011 for storing information and instructions.

Computer system 1000 may further be coupled to a display device 1021, such as a cathode ray tube (CRT) or liquid crystal display (LCD), coupled to bus 1011 for displaying information to a computer user. An alphanumeric input device 1022, including alphanumeric and other keys, may also be coupled to bus 1011 for communicating information and command selections to processor 1012. An additional user input device is cursor control 1023, such as a mouse, trackball, trackpad, stylus, or cursor direction keys, coupled to bus 1011 for communicating direction information and command selections to processor 1012, and for controlling cursor movement on display 1021.

Another device that may be coupled to bus 1011 is hard copy device 1024, which may be used for printing instructions, data, or other information on a medium such as paper, film, or similar types of media. Furthermore, a sound recording and playback device, such as a speaker and/or microphone may optionally be coupled to bus 1011 for audio interfacing with computer system 1000. Another device that may be coupled to bus 1011 is a wired/wireless communication capability 1025 to communication to a phone or handheld palm device.

Note that any or all of the components of system 1000 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

We claim:

1. A method comprising:
  obtaining information from a file of a compressed representation of an image; and
  locating a machine-readable code in a portion of compressed image data from the compressed representation of the image based on the information while the compressed image data is in a compressed format.

2. The method defined in claim 1 wherein the information comprises header data and wherein locating the machine-readable code is based on information in the header data in the file.

3. The method defined in claim 1 wherein the file comprises a JPEG 2000 file.

4. The method defined in claim 1 wherein locating the machine-readable code comprises:
  extracting a location of the machine-readable code from header data in the file; and
  verifying the location of the machine-readable code by decoding a portion of the file.

5. A method, comprising:
  obtaining information from a file of a compressed representation of an image; and locating a machine-readable code in the compressed representation of the image, by
    extracting a location of the machine-readable code from header data in the file using an allocation of bits for each code block for each level to select a location in the image that potentially contains a machine-readable code, and
    verifying the location of the machine-readable code by decoding a portion of the file.

6. A method, comprising:
  obtaining information from a file of a compressed representation of an image; and
  locating a machine-readable code in the compressed representation of the image, by
    extracting a location of the machine-readable code from header data in the file using a plurality of bit allocation matrices to select the location in the image, wherein each of the bit allocation matrices is an allocation of bits for each code-block for each level, and
    verifying the location of the machine-readable code by decoding a portion of the file.

7. A method comprising:
  obtaining information from a file of a compressed representation of an image; and
  locating a machine-readable code in the compressed representation of the image, by
    extracting a location of the machine-readable code from header data in the file, and
    verifying the location of the machine-readable code, based on wavelet coefficients along horizontal and vertical directions in the file, by decoding a portion of the file.

8. A method comprising:
  obtaining information from a file of a compressed representation of an image; and
  locating a machine-readable code in the compressed representation of the image, by
    extracting a location of the machine-readable code from header data in the file, and
    verifying the location of the machine-readable code by decoding a portion of the file, where for each candidate machine-readable code location,
    calculating a horizontal variance distribution;
    detecting top and bottom boundaries based on the horizontal variance distribution;
    calculating a vertical average coefficient distribution; and
    detecting left and right boundaries based on the vertical average coefficient distribution.

9. The method defined in claim 8 further comprising:
  calculating correlations between neighboring rows of coefficients;
  rejecting a candidate machine-readable code location based on a relationship between an average correction between rows and a threshold.

10. The method defined in claim 9 wherein rejecting the candidate machine-readable code location based on a relationship between an average correction between rows and a threshold comprises rejecting the candidate machine-readable code location based on whether the average correction is above a threshold.

11. The method defined in claim 8 further comprising:
  generating a ratio of the horizontal variance to the vertical variance;
  rejecting a candidate machine-readable code location if based on a relationship between the ratio of the horizontal variance to the vertical variance and a threshold.

12. The method defined in claim 11 wherein rejecting a candidate machine-readable code location if based on a relationship between the ratio of the horizontal variance to the vertical variance and a threshold comprises rejecting a candidate machine-readable code location if the ratio of the horizontal variance to the vertical variance is below the threshold.

13. A method comprising:
obtaining information from a file of a compressed representation of an image;
locating a machine-readable code in a portion of compressed image data in the compressed representation of the image while the compressed image data is in a compressed format; and
modifying the file to include information indicative of the machine-readable code.

14. The method defined in claim 13 wherein the information indicative of the machine-readable code comprises one or more of the location of the machine-readable code and a decoded value of the machine-readable code.

15. The method defined in claim 13 wherein modifying the file to include the information indicative of the machine-readable code comprises recording the information indicative of the machine-readable code in metadata in the file.

16. The method defined in claim 15 wherein the information indicative of the machine-readable code comprises one or more of the location of the machine-readable code and a decoded value of the machine-readable code.

17. The method defined in claim 1 wherein obtaining the information from a file of a compressed representation of an image comprises extracting header information from the file, and wherein locating the machine-readable code in the compressed representation of the image comprises partially decoding a portion of the compressed file.

18. The method defined in claim 1 wherein the machine-readable code comprises a barcode.

19. The method defined in claim 1 wherein the image is a JPEG 2000 document image.

20. An apparatus comprising:
an extraction unit to extract information from a file of a compressed representation of an image; and
a code locator to locate a machine-readable code in a portion of compressed image data in the compressed representation of the image while the compressed image data is in a compressed format.

21. The apparatus defined in claim 20 wherein the information comprises header data and wherein the code locator locates the machine-readable code based on information in the header data in the file.

22. The apparatus defined in claim 20 wherein the file comprises a JPEG 2000 file.

23. The apparatus defined in claim 20 wherein the code locator comprises:
a candidate code detection unit to extract a location of the machine-readable code from header data in the file; and
a code refinement unit to verify the location of the machine-readable code by decoding a portion of the file.

24. An apparatus, comprising:
an extraction unit to extract information from a file of a compressed representation of an image;
a code locator to locate a machine-readable code in the compressed representation of the image, with
a candidate code detection unit to extract a location of the machine-readable code from header data in the file, wherein the candidate code detection unit extracts the location of the machine-readable code from header data in the file comprises using an allocation of bits for each code-block for each level to select a location in the image that potentially contains a machine-readable code; and
a code refinement unit to verify the location of the machine-readable code by decoding a portion of the file.

25. An apparatus, comprising:
an extraction unit to extract information from a file of a compressed representation of an image;
a code locator to locate a machine-readable code in the compressed representation of the image, with
a candidate code detection unit to extract a location of the machine-readable code from header data in the file, wherein the candidate code detection unit extracts the location of the machine-readable code from header data in the file comprises using a plurality of bit allocation matrices to select the location in the image, wherein each of the bit allocation matrices is an allocation of bits for each code-block for each level; and
a code refinement unit to verify the location of the machine-readable code by decoding a portion of the file.

26. An apparatus, comprising:
an extraction unit to extract information from a file of a compressed representation of an image;
a code locator to locate a machine-readable code in the compressed representation of the image, with
a candidate code detection unit to extract a location of the machine-readable code from header data in the file; and
a code refinement unit to verify the location of the machine-readable code by decoding a portion of the file, wherein the code refinement unit verifies the location of the machine-readable code based wavelet coefficients along horizontal and vertical directions in the file.

27. An apparatus, comprising:
an extraction unit to extract information from a file of a compressed representation of an image;
a code locator to locate a machine-readable code in the compressed representation of the image, with
a candidate code detection unit to extract a location of the machine-readable code from header data in the file; and
a code refinement unit to verify the location of the machine-readable code by decoding a portion of the file, wherein the code refinement unit verifies the location of the machine-readable code by, for each candidate machine-readable code location,
calculating a horizontal variance distribution;
detecting top and bottom boundaries based on the horizontal variance distribution;
calculating a vertical average coefficient distribution; and
detecting left and right boundaries based on the vertical average coefficient distribution.

28. The apparatus defined in claim 27 wherein the code refinement unit:
calculates correlations between neighboring rows of coefficients;
rejects a candidate machine-readable code location based on a relationship between an average correction between rows and a threshold.

29. The apparatus defined in claim 28 wherein the code refinement unit rejects the candidate machine-readable code location based on whether the average correction is above a threshold.

30. The apparatus defined in claim 27 wherein the code refinement unit:
generates a ratio of the horizontal variance to the vertical variance;

rejects a candidate machine-readable code location if based on a relationship between the ratio of the horizontal variance to the vertical variance and a threshold.

31. The apparatus defined in claim 30 wherein the code refinement unit rejects the candidate machine-readable code location if the ratio of the horizontal variance to the vertical variance is below the threshold.

32. The apparatus defined in claim 20 further comprising a file editor to modify the file to include information indicative of the machine-readable code.

33. The apparatus defined in claim 32 wherein the information indicative of the machine-readable code comprises one or more of the location of the machine-readable code and a decoded value of the machine-readable code.

34. The apparatus defined in claim 32 wherein modifying the file to include the information indicative of the machine-readable code comprises recording the information indicative of the machine-readable code in metadata in the file.

35. The apparatus defined in claim 34 wherein the information indicative of the machine-readable code comprises one or more of the location of the machine-readable code and a decoded value of the machine-readable code.

36. The apparatus defined in claim 20 wherein the machine-readable code comprises a barcode.

37. The apparatus defined in claim 20 wherein the image is a JPEG 2000 document image.

38. A method comprising:
receiving a file of a compressed representation of an image; and
using header data of the file for locating, in a portion of compressed image data in a compressed image domain, one or more machine-readable codes in the image while the compressed image data is in a compressed format.

39. The method defined in claim 38 wherein using the header data comprises:
extracting one or more potential machine-readable code locations of the one or more machine-readable codes from header data in the file; and
verifying whether each of the one or more potential machine-readable code locations is a location of a machine-readable code by checking decoded data for a portion of the file.

40. The method defined in claim 39 wherein the file comprises a JPEG 2000 file and the decoded data comprises decoded coefficients of the JPEG 2000 file.

41. A method, comprising:
receiving a file of a compressed representation of an image; and
using header data of the file for locating one or more machine-readable codes in the image, by
extracting one or more potential machine-readable code locations of the one or more machine-readable codes from header data in the file; and
verifying whether each of the one or more potential machine-readable code locations is a location of a machine-readable code, based on a difference in local variances of wavelet coefficients along horizontal and vertical directions, by checking decoded data for a portion of the file.

42. The method defined in claim 38 wherein the machine-readable code comprises a barcode.

43. The method defined in claim 38 wherein the image is a JPEG 2000 document image.

44. A method comprising:
receiving a file of a compressed representation of an image;
locating one or more machine-readable codes in a portion of compressed image data in a compressed image domain of the image while the compressed image data is in a compressed format; and
modifying the file to include information indicative of the one or more machine-readable codes.

45. The method defined in claim 44 wherein locating one or more machine-readable codes in the image is performed without decompressing all of the compressed representation of the image.

46. The method defined in claim 45 wherein the information indicative of the one or more machine-readable codes comprises the location of the one or more machine-readable codes and a decoded value for each of the one or more machine-readable codes.

47. The method defined in claim 45 wherein modifying the file to include the information indicative of the one or more machine-readable codes comprises recording the information indicative of the one or more machine-readable codes in metadata in the file.

48. The method defined in claim 47 wherein the information indicative of the one or more machine-readable codes comprises the location of each of the one or more machine-readable codes and a decoded value of each of the one or more machine-readable codes.

49. The method defined in claim 44 wherein each of the one or more machine-readable codes comprises a barcode.

50. The method defined in claim 44 wherein the image is a JPEG 2000 document image.

51. A method comprising:
performing image analysis on a compressed file using header data associated with the compressed file to locate one or more machine-readable codes while the compressed file is in a compressed format;
selecting a portion of compressed image data of the compressed file based on results of the image analysis; and
partially decoding the portion of the compressed file to verify a location of the one or more machine-readable codes.

52. A method, comprising:
performing image analysis on a compressed file using header data associated with the compressed file;
selecting a portion of the compressed file based on results of the image analysis wherein the portion of the compressed file comprises a set of wavelet coefficients; and
partially decoding the portion of the compressed file.

53. A method, comprising:
performing image analysis on a compressed file using header data associated with the compressed file;
selecting a portion of the compressed file based on results of the image analysis wherein selecting the portion is based on variances in coefficients of the compressed file; and
partially decoding the portion of the compressed file.

54. The method defined in claim 51 wherein the compressed file is a JPEG 2000 file.

55. The method defined in claim 51 wherein the header data comprises information about a codeblock in the compressed file.

56. A method comprising:
locating a machine-readable code in compressed image data of a compressed file while the compressed image data is in a compressed format;
creating a modified version of the compressed file to include a location of the machine-readable code in the compressed file.

57. The method defined in claim 56 wherein the machine-readable code comprises a bar code.

58. The method defined in claim 56 wherein the compressed file is a JPEG 2000 file.

59. The method defined in claim 56 wherein locating the machine-readable code in the compressed file is based on analyzing header data in the compressed file.

60. The method defined in claim 59 wherein the header data comprises information about a codeblock in the compressed file.

61. The method defined in claim 56 wherein locating the machine-readable code in the compressed file comprises partially decoding a portion of the compressed file.

62. A method, comprising:

locating a machine-readable code in a compressed file by partially decoding a portion of the compressed file, wherein the portion of the compressed file comprises a set of wavelet coefficients; and creating a modified version of the compressed file to include a location of the machine-readable code in the compressed file.

63. A method comprising:

locating a machine-readable code in a compressed image data of a compressed file while the compressed image data is in a compressed format;

decoding a portion of the compressed file to obtain pixel domain data;

creating a modified version of the compressed file by storing one or more decoded values associated with the machine-readable code as metadata.

64. The method defined in claim 63 wherein the machine-readable code comprises a bar code.

65. The method defined in claim 63 wherein the compressed file is a JPEG 2000 file.

66. The method defined in claim 63 wherein locating the machine-readable code in the compressed file is based on analyzing header data in the compressed file.

67. The method defined in claim 66 wherein the header data comprises information about a codeblock in the compressed file.

68. The method defined in claim 63 wherein locating the machine-readable code in the compressed file comprises partially decoding a portion of the compressed file.

69. A method, comprising:

locating a machine-readable code in a compressed file by partially decoding a portion of the compressed file, wherein the portion of the compressed file comprises a set of wavelet coefficients;

decoding a portion of the compressed file to obtain pixel domain data; and creating a modified version of the compressed file by storing one or more decoded values associated with the machine-readable code as metadata.

70. A method comprising:

locating a machine-readable code in a compressed image data of a compressed file while the compressed image data is in a compressed format;

decoding a portion of the compressed file to obtain pixel domain data;

rewriting the machine-readable code;

recompressing the portion of the compressed file to create a modified version of the compressed file having a more readable version of the machine-readable code.

71. The method defined in claim 70 wherein the machine-readable code comprises a bar code.

72. The method defined in claim 70 wherein the compressed file is a JPEG 2000 file.

73. The method defined in claim 70 wherein locating the machine-readable code in the compressed file is based on analyzing header data in the compressed file.

74. The method defined in claim 73 wherein the header data comprises information about a codeblock in the compressed file.

75. The method defined in claim 70 wherein locating the machine-readable code in the compressed file comprises partially decoding a portion of the compressed file.

76. A method comprising:

locating a machine-readable code in compressed image data of a compressed file by partially decoding a portion of the compressed file, wherein the portion of the compressed file comprises a set of wavelet coefficients;

decoding a portion of the compressed file to obtain pixel domain data;

rewriting the machine-readable code;

recompressing the portion of the compressed file to create a modified version of the compressed file having a more readable version of the machine-readable code.

\* \* \* \* \*